(12) United States Patent  (10) Patent No.: US 8,924,260 B1
Priebatsch  (45) Date of Patent: Dec. 30, 2014

(54) DYNAMIC INGESTION AND PROCESSING OF TRANSACTIONAL DATA AT THE POINT OF SALE

(71) Applicant: Seth Priebatsch, Boston, MA (US)

(72) Inventor: Seth Priebatsch, Boston, MA (US)

(73) Assignee: SCVNGR, Inc., Boston, MA (US)

( * ) Notice: Subject to any disclaimer, the term of this patent is extended or adjusted under 35 U.S.C. 154(b) by 0 days.

(21) Appl. No.: 14/172,163

(22) Filed: Feb. 4, 2014

(51) Int. Cl.
*G06Q 20/00* (2012.01)
*G06Q 20/20* (2012.01)
*G06E 1/02* (2006.01)

(52) U.S. Cl.
CPC ............. *G06Q 20/204* (2013.01); *G06E 1/02* (2013.01); *G06Q 20/20* (2013.01)
USPC .......................................................... 705/16

(58) Field of Classification Search
CPC .............................. G06Q 20/20; G06Q 20/204
USPC .......................................................... 705/16
See application file for complete search history.

(56) References Cited

U.S. PATENT DOCUMENTS

| | | | | |
|---|---|---|---|---|
| 5,396,417 | A * | 3/1995 | Burks et al. ..................... 705/17 |
| 5,719,382 | A * | 2/1998 | White ............................ 235/375 |
| 7,081,979 | B2 * | 7/2006 | Cotter et al. .................. 359/107 |
| 2005/0091068 | A1* | 4/2005 | Ramamoorthy et al. ........ 705/1 |
| 2011/0246284 | A1* | 10/2011 | Chaikin et al. ............. 705/14.38 |

FOREIGN PATENT DOCUMENTS

| | | | |
|---|---|---|---|
| CN | 101593197 A | * | 12/2009 |
| KR | 2010097951 A | * | 9/2010 |

\* cited by examiner

*Primary Examiner* — Scott Zare
(74) *Attorney, Agent, or Firm* — Morgan, Lewis & Bockius LLP

(57) ABSTRACT

A point-of-sale terminal differentiates dynamically among different data streams by processing data encoded with "sentinels" that bracket the beginning and end of the data and identify the type of data.

15 Claims, 3 Drawing Sheets

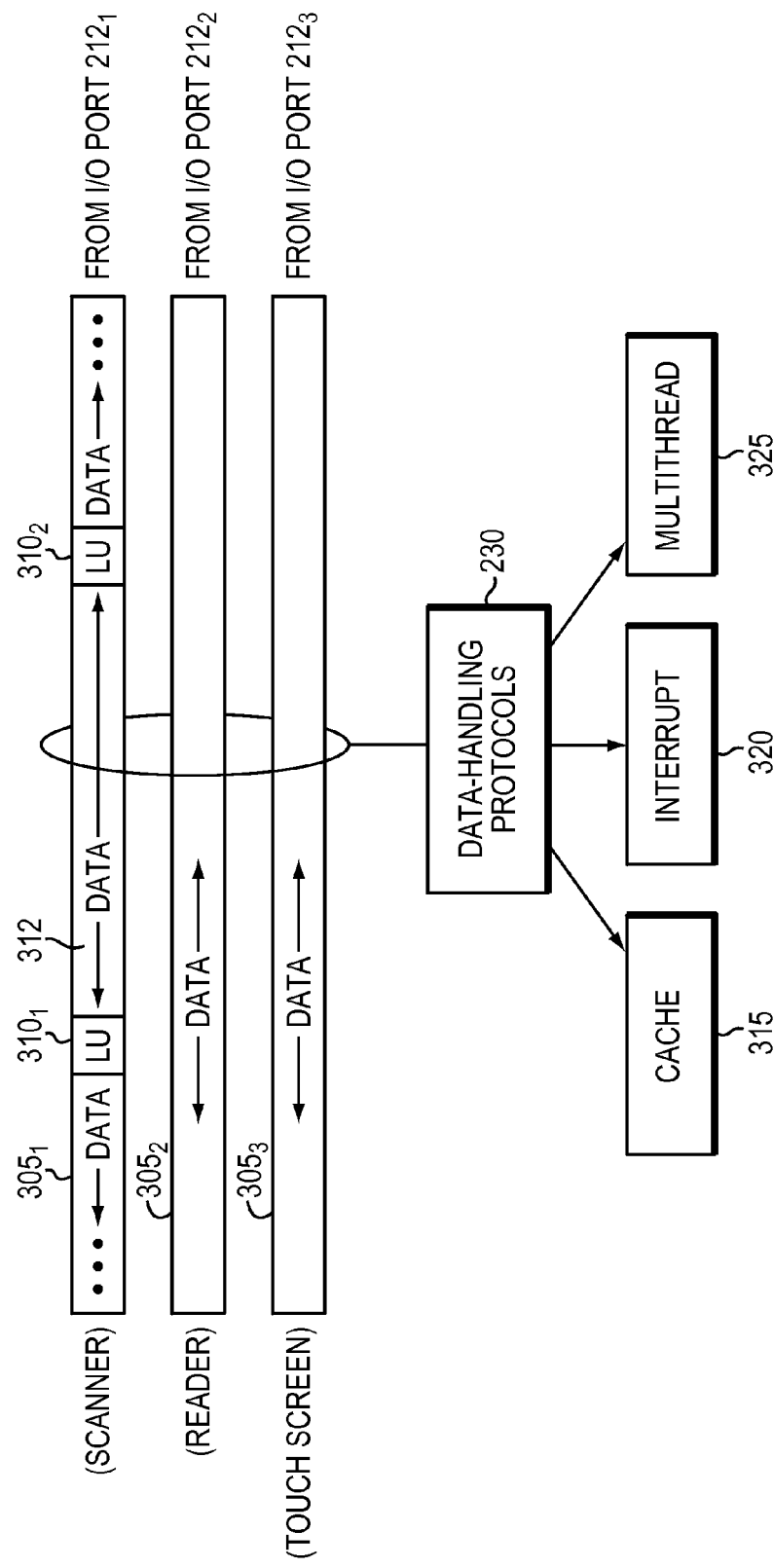

DYNAMIC INGESTION AND PROCESSING OF TRANSACTIONAL DATA AT THE POINT OF SALE

FIELD OF THE INVENTION

In various embodiments, the present invention relates generally to systems and methods for processing payment transactions.

BACKGROUND

It is common practice for consumers to pay a merchant electronically for goods or services received. Electronic payments are typically made with a token that identifies a source of funding. For example, a credit card containing a magnetic strip is a token. Payment tokens usually contain static information, such as an account number, identifying a source of payment. When a credit card is swiped through a reader at the point of sale (POS), the card number is obtained and transmitted to a centralized payment-processing system. More specifically, the reader is operatively connected to a POS terminal, different models of which vary in terms of complexity but generally include cash-register functionality to accept manual input, communications capability and, in many cases, item-scanning hardware. The POS terminal obtains the consumer's credit-card information from the reader and transmits it to the payment-processing system along with relevant data regarding the transaction.

More recent POS systems allow a consumer to pay for a transaction using a mobile device to display a token (often in the form of a barcode or QR code). Like credit cards, mobile device tokens typically contain static information that must be transmitted to a centralized payment-processing system for authentication and payment authorization. An optical or near-field communication (NFC) reader communicates with and obtains the electronic token information and provides this to the POS terminal; in some implementations, the optical reader is the same one used to scan product barcodes for checkout. These various readers and scanners are herein referred to simply as a "reader" (and, indeed, the various data-acquisition capabilities may well be integrated into a single device associated with the POS terminal). The POS terminal combines the token with other transaction information (e.g., the purchase amount and the identity of the merchant) and submits this, directly or via an aggregating transaction server, to the appropriate payment processor to complete the transaction.

The POS terminal, therefore, receives data from multiple sources—potentially at the same time and/or from different sources through the same input device. For example, the cashier may be scanning items or entering data via a POS terminal touchscreen as the consumer presents a token to the reader, or the scanner may read both product barcodes and the consumer's token. The more versatile the reader and the more types of token data it can accept, the greater will be the burden on the POS system to recognize and differentiate among data streams. This burden may be shifted to the cashier, who is then expected to designate, manually, the type of data the POS terminal is about to receive from the reader and thereafter to take further steps to complete the transaction. In sum, there is a need for improved ways of managing the multiple streams of data presented to the POS terminal without merely shifting the burden or lengthening transaction processing.

SUMMARY

In various embodiments, the present invention enables a POS terminal to differentiate dynamically among different data streams by encoding a data stream with "sentinels" that bracket the beginning and end of the relevant data. This data can then be automatically and efficiently isolated from other data streams and handled in a manner specific to that type of data.

For example, a consumer may sign up with a payment service that issues one or more electronic tokens (e.g., QR codes) downloaded to the consumer's wireless phone. The token may, for example, uniquely identify the consumer and be tied to the consumer's records with the payment service. During a payment transaction, the token may be acquired by the reader and passed to the POS terminal, which may combine it with merchant-identifying information for transmission to the payment service; the payment service may thereupon send an authorization back to the POS terminal, which completes the transaction. In this case, the sentinels bracket the token data to differentiate it both from accompanying information (e.g., meta-data) as well as from other data streams. The sentinels may be any sequence of bits or characters that reliably differentiate from commonly processed data and so can be easily recognized (and thereby identify the bracketed data as, for example, a token)—e.g., one or more ASCII characters (such as the character sequence LU or .:) at the beginning and end of the data stream. This approach offers greater flexibility than, for example, simply knowing the length of the data format and using a single starting sentinel. When the bracketed data corresponds to a QR code presented by a consumer and acquired by the reader, it may be handled in any of various ways. In one embodiment, the first sentinel acts as a signal to the reader or POS terminal to cache the token data until the POS terminal is ready to use it—i.e., when the terminal completes a current task and can transmit the data to the payment service. In another embodiment, the POS terminal interrupts execution of the current task when it detects the first sentinel, and receives the ensuing stream of data for processing. If it is not possible to interrupt the current task, the data may be cached or the reader rendered inactive until the POS terminal is ready to receive the data. In still other embodiments, the POS terminal continues executing the current task and concurrently receives the data, e.g., using multiple simultaneous execution threads. Yet another approach is to cache the data at the reader and allow the cashier to manually signal the reader to release the data to the POS terminal when all transaction data has been entered.

This approach is quite different from the way, for example, credit-card data is conventionally read. In typical systems the credit-card data is not differentiated from other inputs, and indeed, the way card data is identified is unsuitable for data differentiation in any case: card data is generally identified by a leading single digit (indicating a card type), which is insufficient to differentiate card data from other data. Whether a collection of numbers is a credit card may be determined using the well-known Luhn algorithm, for example, but this is computationally expensive and is therefore generally not done at runtime in a POS. Additionally, it would have to be run on all iterations of 15 or 16 digit strings coming through the POS.

Accordingly, in a first aspect, the invention relates to a method of processing a transaction at a POS terminal. In various embodiments, the method comprises the steps of receiving, by the POS terminal, a stream of data from a credential reader; recognizing, by the POS terminal, a first data sequence in the received data stream; in response to the recognized first data sequence, handling, by the POS terminal, transaction data following the first data sequence according to a data-processing protocol stored on the POS terminal; recognizing, by the POS terminal, a second data sequence in the received data stream; in response to the recognized first second data sequence, terminating, by the POS terminal, data handling according to the data-processing protocol; and completing, by the POS terminal, a transaction based on the transaction data. In typical implementations, the first and second data sequences are identical sentinels.

In one embodiment, the data-processing protocol comprises, by the POS terminal, (i) caching the transaction data and (ii) during an interval when the POS terminal is not executing other tasks, combining the cached transaction data with item-purchase data received at the POS terminal and transmitting the data to a transaction-processing server for approval. In another embodiment, the data-processing protocol comprises, by the POS terminal, (i) interrupting execution of a current task and (ii) combining the transaction data with item-purchase data received at the POS terminal and transmitting the data to a transaction-processing server for approval. Execution of the current task may be resumed following data transmission; for example, the data stream from the current task may be buffered during the combining and transmitting steps.

In still another embodiment, the data-processing protocol comprises, by the POS terminal, (i) continuing execution of the current task while concurrently combining the transaction data with item-purchase data received at the POS terminal and (ii) transmitting the data to a transaction-processing server for approval. For example, concurrent execution of the current task and the combining and transmitting steps may occur via multithreading (e.g., interleaving data and instructions corresponding to the current task with the transaction data and instructions corresponding to the transmission).

In yet another embodiment, the data-processing protocol comprises (i) caching the transaction data in the reader and (ii) upon a trigger signal, releasing the cached transaction data for transmission by the POS terminal to a transaction-processing server for approval. For example, the trigger signal may be provided by the cashier's manual selection of a switch or pressing a button on the POS terminal or the reader.

In another aspect, the invention pertains to a terminal for processing transactions at the point of sale. The terminal may comprise a communications interface, a computer memory, an input port for receiving data from a credential reader, and a processor. In various embodiments, the processor is configured to (i) recognize a first data sequence in a data stream received from the credential reader via the input port, (ii) retrieve from the computer memory a data-processing protocol in response to the recognized first data sequence, (iii) execute the data-processing protocol and handle, in accordance therewith, transaction data following the first data sequence, (iv) recognize a second data sequence in the received data stream and, in response thereto, terminating data handling according to the data-processing protocol, and (v) complete a transaction based on the transaction data.

The processor may be further configured to complete the transaction by combining the transaction data with purchase data including item-purchase data and causing transmission, via the communications interface, of the combined data to a transaction processor.

In some embodiments, execution of the data-processing protocol by the processor causes the processor to cache the transaction data in the computer memory and cause the transmission to occur during an interval when the processor is not executing other tasks. Alternatively, execution of the data-processing protocol by the processor may cause interruption of the concurrently executing task and immediate transmission of the combined data, followed by resumed execution of the interrupted task.

In other embodiments, execution of the data-processing protocol by the processor causes the processor to continue execution of the current task while concurrently causing the transaction data to be combined with item-purchase data and transmitted to the transaction processor. In still other embodiments, execution of the data-processing protocol by the processor causes the reader to store the transaction data therein and, upon a trigger signal, to release the cached transaction to the terminal for combination with item-purchase data and transmission to the transaction processor.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which:

FIG. 3 schematically illustrates various modes of data handling for embodiments of the invention.

DETAILED DESCRIPTION

Figure 1:
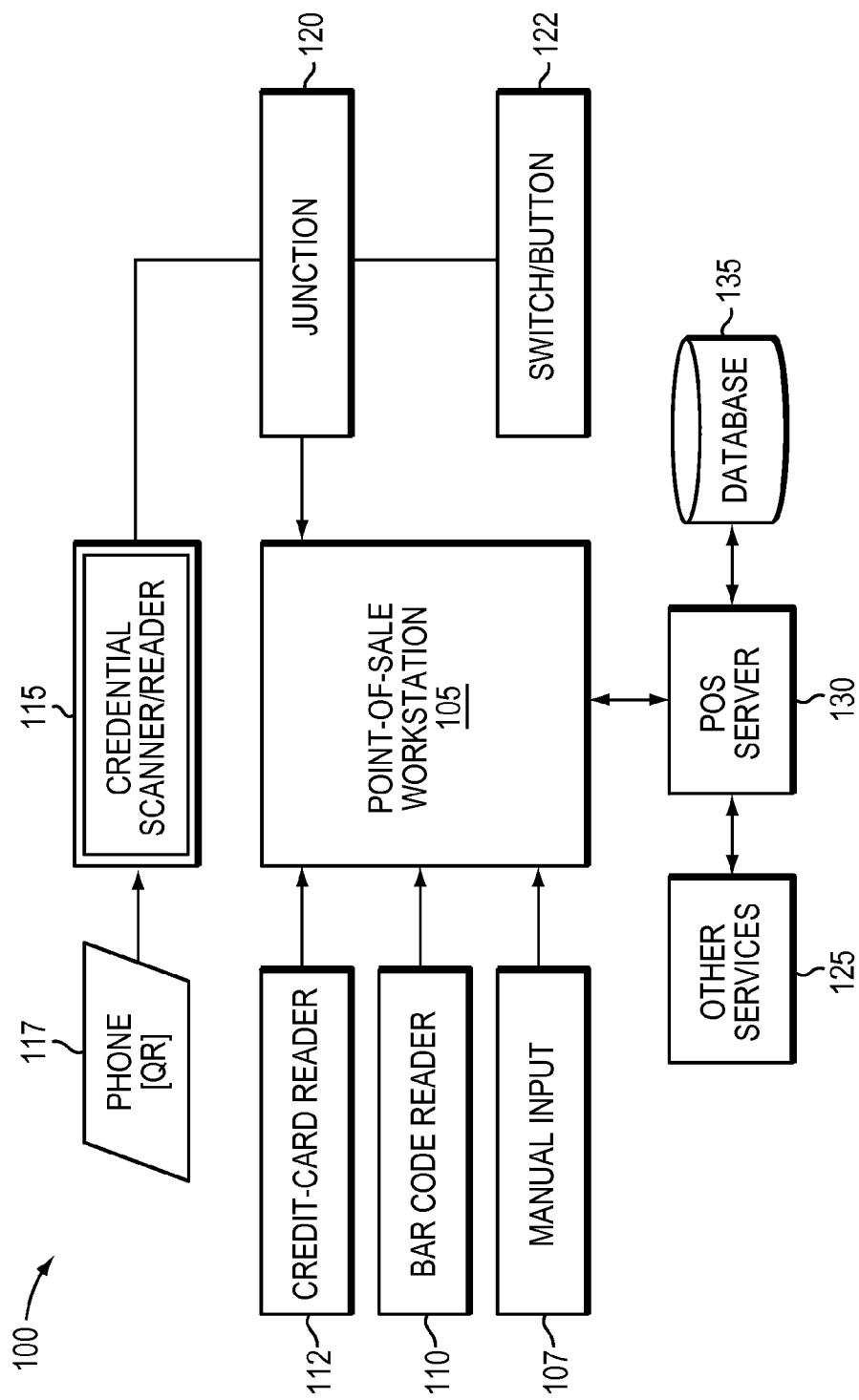
FIG. 1 is a block diagram of an exemplary POS system in accordance with an embodiment of the invention.

Refer first to FIG. 1, which depicts a POS system 100 in accordance with an embodiment of the invention. The heart of the system 100 is a POS workstation 105, the details of which are discussed below. The workstation 105 is typically operated by a cashier where goods and/or services (hereafter, "items") are sold, and performs several basic tasks. A manual input interface 107 allows the cashier to execute basic transactional tasks relating to a sale, such as data entry, receipt generation, etc. A barcode reader 110 scans the barcodes of items to be purchased, and a credit-card reader 112 reads the magnetic strips of credit cards swiped by consumers. A credential scanner 115 uses an optical and/or NFC modality to read consumer credentials and/or payment tokens (e.g., in the form of a "Quick Response" (QR) code) from a consumer's mobile device 117. As used herein, the term "mobile device" refers to a "smart phone" or tablet with advanced computing ability that, generally, facilitates bi-directional communication and data transfer using a mobile telecommunication network, and is capable of executing locally stored applications and/or payment transactions. Mobile devices include, for example, IPHONES (available from Apple Inc., Cupertino, Calif.), BLACKBERRY devices (available from Research in Motion, Waterloo, Ontario, Canada), or any smart phones equipped with the ANDROID platform (available from Google Inc., Mountain View, Calif.), tablets, such as the IPAD and KINDLE FIRE, and personal digital assistants (PDAs).

The peripheral devices 107, 110, 112, 115 are conventional and may be deployed in any convenient fashion—i.e., as part of the workstation 105 or as separate devices connected thereto—and moreover, the functions of these devices may be combined as desired (e.g., a single unit may combine the functions of readers 112, 115). As explained in further detail below, credential scanner 115 may be connected to workstation 105 via a junction box 120 that connects a switch or button 122 to workstation 105 to control its interaction with scanner 115.

The workstation 105 communicates directly or indirectly with one or more servers 125 that provide support and payment services. For example, most merchants are not equipped to handle the data security required to process transactions themselves and instead use the services of a third-party payment processor to move credit-card transactions through the card network. Credentials scanned from a mobile device may propagate to and through a different network, which itself communicates with payment processors to complete transactions. Communications between workstation 105 and servers 125 typically occur through a POS server 130, which aggregates and manages the service requests of all of the workstations 105 in, for example, a single retail store or across stores. The merchant may also manage gift or prepaid cards, as well as merchant-specific tokens generated by the merchant itself or (more typically) a third party, via a database 135 that stores consumer account and balance information.

Figure 2:
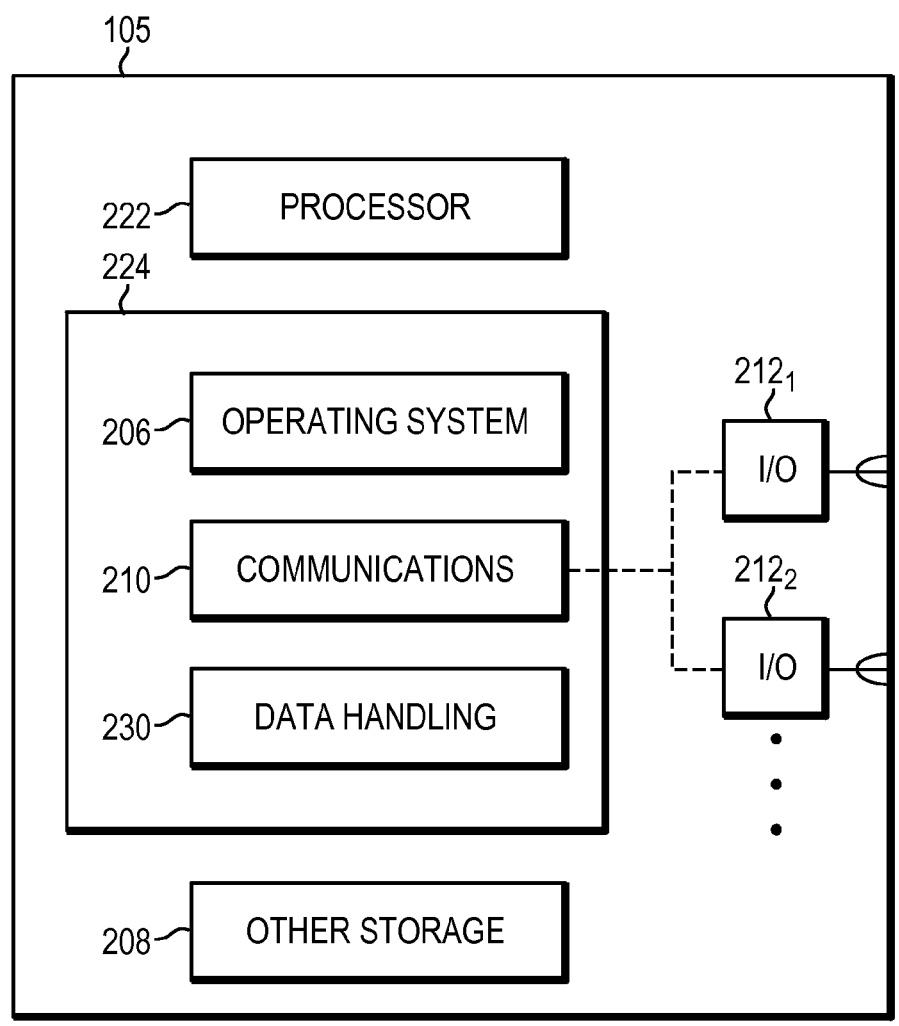
FIG. 2 is a block diagram of a POS workstation in accordance with an embodiment of the invention.

FIG. 2 illustrates the components of a representative POS workstation 105. The depicted system includes a processor 202 and a memory 204, which may include volatile and non-volatile portions. The memory 204 contains instructions, conceptually illustrated as a group of modules, that control the operation of the processor 202 and its interaction with hardware components. An operating system 206 directs the execution of low-level, basic system functions such as memory allocation, file management, and operation of mass storage devices 208. At a higher level, a communication module 210 handles local and remote communications, e.g., with POS server 130 (via, e.g., an Ethernet link) and peripheral devices (e.g., readers) via one or more input/output (I/O) ports 212. More generally, the communication module 210 may include conventional components (e.g., a network interface or transceiver) designed to provide communication with a network, such as the Internet and/or any other land-based or wireless telecommunications network or system, and, through the network, with one or more servers. The communication module 210 may be capable of communicating via different communication channels, e.g., a computer network or the Internet for some purposes and the public telecommunications infrastructure for other purposes.

Memory 224 may contain one or more data-handling protocols 230 that, when executed by processor 222, dictate the manner in which incoming data (received, for example, via an I/O port 212) are handled. Of particular interest in the present context is handling of data received from credential scanner 115 (see FIG. 1) via I/O port 212.

Operation of data-handling protocols in accordance herewith may be understood with reference to FIGS. 1-3. The POS terminal 105 may simultaneously receive a plurality of data streams from multiple peripheral sources such as a scanner 115, a reader 112/115, and a touch screen 107. Each of the data streams $305_1$, $305_2$, $305_3$ may reach the system 100 via an I/O port $212_1$, $212_2$, $212_3$. Although conventional systems may prevent the appearance of simultaneous data streams by, for example, preventing a consumer from swiping her credit card until the workstation is ready to receive the data (and is receiving no other data), the data-handling protocols 230 enable multiple streams 305 to enter the system 100 simultaneously; this means, for example, that scanner 115 can be constantly operative so that the consumer is always free to present a credential without restriction or prompting.

With particular reference to the data stream $305_1$ from the credential scanner 115, this data stream includes a pair of sentinels $310_1$, $310_2$ that "bracket" the operative credential data 312, e.g., an encrypted token. Data preceding the credential 312 may be simple identifying codes that announce to system 100 that credential scanner 115 has "woken up" to the presence of a consumer's smart phone and has obtained a credential therefrom. This may occur as the cashier is scanning items that the consumer has presented for purchase, resulting in the simultaneous entry of data stream $305_2$. Operation of the data-handling protocol may be assisted by the sentinels 310. Thus, in accordance with a first exemplary protocol, data following the first sentinel $310_1$ and terminating with the second sentinel $310_2$ is sent to a cache 315, which may be a separate memory device or a partition within memory 224. This may occur, for example, if the cashier continues to scan items for purchase, so credential data cannot yet be utilized. When scanning is complete, the data-handling protocol 230 combines the cached credential with purchase data (e.g., the total purchase price and the identity of the merchant) and sends this to POS server 130 for ultimate transmission to a payment processor.

Another data-handling protocol 230, upon recognizing the leading sentinel $310_1$, invokes an interrupt routine 320 that causes the processor to suspend execution of the current task in order to process the incoming credential data. This data-handling protocol may be invoked, for example, when all transaction data has been obtained and queued for transmission, and the only missing item is the credential. In such circumstances, the tasks then being executed by processor 222 are likely low-level "housekeeping" operations that can be safely interrupted; and if this is not the case, the interrupt routine 320 will be associated with a priority level so that its interrupt request may be rejected until the higher-priority tasks are complete. In any case, following completion of the transaction and transmission of the transaction data, the interrupted task resumes execution. It should be noted that executing the interrupt need not suspend data-transfer activities. For example, data arriving via another I/O port 212 may be buffered in a partition of memory 224 rather than rejected, and can be utilized when execution of the relevant task resumes.

Still another exemplary data-handling protocol 230 supports concurrent execution of multiple tasks, and combination of associated data streams, by multithreading or other concurrent execution methodology. A conventional multithreading module 325, which may be implemented in software and/or hardware, interleaves execution of instructions from different program threads on the same execution pipeline, scheduling them for independent but concurrent execution. This both avoids or minimizes execution latencies while permitting uninterrupted entry of data relating to different tasks, and received via different I/O ports. If too many streams of data arrive simultaneously, they are buffered under the control of multithreading module 325.

Another exemplary data-handling protocol 230 communicates with the source of data that the system 100 is not yet ready to process, and instructs the source to cache the data locally (i.e., in memory resident in the device). Alternatively, local data caching may be the default condition. Either way, under this approach, data is maintained in the local source memory until the cashier manually signals readiness to use the cached data. For example, scanner 115 may ingest a consumer's credentials (e.g., a token read optically or via NFC from a smart phone) and store it in a local computer memory until the cashier presses the switch or button 122; this prompts scanner 115 to release the stored data to POS workstation 105. It should be understood that switch/button 122 may be located on scanner 115, may be a separate device, or may be an option appearing on touch screen 107 for the cashier to select.

Data-handling protocols 230 can take the form of a single rule-based protocol whose execution varies with the current data streams, execution threads, and operational context. Alternatively, memory 224 may store a plurality of data-handling protocols 230, which are selectively invoked by a supervisory program depending on conditions such as the type of data, its source, current tasks being handled, etc. The only real distinction between these approaches is program modularity, and the use of multiple protocols, whether as separate programs or discrete objects (in an object-oriented environment) within a single overall program, allows each to be modified independently without disrupting other protocols. For example, a "caching object" can be invoked by the supervisory program during periods when POS workstation is executing high-priority tasks or when data from a particular source cannot yet be processed (e.g., data from scanner 115 prior to completion of item scanning), in which case the data from scanner 115 is stored in volatile memory; while upon completion of item scanning, an "interrupt object" may be invoked so that the cached or incoming data from scanner 115 is immediately combined with transaction data and sent to server 125 for transaction processing, thereby minimizing the delay experienced by the consumer and enabling maximum cashier productivity.

It should also be understood that the present invention is not limited to a single set of sentinels 310. A data stream may contain multiple sets of sentinels, and these can, if desired, be embedded hierarchically; for example, between beginning and ending sentinels, a second set of sentinels may identify specific items of data within the sentinel-bracketed data stream—e.g., the user's name. Any desired number of hierarchically organized sets of sentinels may be used, the number being limited merely by the utility of bracketing subsidiary types of data.

More generally, those skilled in the art will readily appreciate that all configurations described herein are meant to be exemplary and that the actual configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, and/or method described herein. In addition, any combination of two or more such features, systems, articles, and/or methods, if such features, systems, articles, and/or methods are not mutually inconsistent, is included within the inventive scope of the present disclosure.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. In addition, the terms like "user device," "mobile," "communication device," and similar terminology, refer to a wireless device (e.g., cellular phone, smart phone, computer, PDA, set-top box, Internet Protocol Television (IPTV), electronic gaming device, printer, and so forth) utilized by a user of a wireless communication service to receive or convey data, control, voice, video, sound, gaming, or substantially any data-stream or signaling-stream. The foregoing terms are utilized interchangeably in the subject specification and related drawings. The terms "component," "system," "platform," "module," and the like refer broadly to a computer-related entity or an entity related to an operational machine with one or more specific functionalities. Such entities can be hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

The processor 222 that executes commands and instructions may be a general-purpose computer, but may utilize any of a wide variety of other technologies including a special purpose computer, a microcomputer, minicomputer, mainframe computer, programmed microprocessor, micro-controller, peripheral integrated circuit element, a CSIC (customer-specific integrated circuit), ASIC (application-specific integrated circuit), a logic circuit, a digital signal processor, a programmable logic device, such as an FPGA (field-programmable gate array), PLD (programmable logic device), PLA (programmable logic array), RFID processor, smart chip, or any other device or arrangement of devices that is capable of implementing the steps of the processes of the invention.

Various implementations of the systems and techniques described here can be realized in digital electronic circuitry, integrated circuitry, specially designed ASICs (application-specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, code or process) include machine instructions for a programmable processor, and can be implemented in a high-level procedural and/or object-oriented programming language, and/or in assembly/machine language.

The POS workstation 105 employs computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the UNIX operating system, the LINUX operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

The storage devices of PO workstation 105 may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described herein. For example, various forms of the flows shown above may be used, with steps re-ordered, added, or removed. Accordingly, other implementations are within the scope of the following claims.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of processing a transaction at a point-of-sale (POS) terminal, the method comprising the steps of:
   receiving, by the POS terminal, a stream of data from a credential reader;
   recognizing, by the POS terminal, a first data sequence in the received data stream;
   in response to the recognized first data sequence, handling, by the POS terminal, transaction data coming in sequence after the first data sequence according to a data-processing protocol stored on the POS terminal;
   recognizing, by the POS terminal, a second data sequence in the received data stream;
   in response to the recognized second data sequence, terminating, by the POS terminal, data handling according to the data-processing protocol; and
   completing, by the POS terminal, a transaction based on the transaction data,
   wherein the data-processing protocol comprises, by the POS terminal:
      interrupting execution of a current task; and
      combining the transaction data with item-purchase data received at the POS terminal and transmitting the data to a transaction-processing server for approval.

2. The method of claim 1, wherein the first data sequence is identical to the second data sequence.

3. The method of claim 1, wherein the data-processing protocol comprises, by the POS terminal:
   caching the transaction data; and
   during an interval when the POS terminal is not executing other tasks, combining the cached transaction data with item-purchase data received at the POS terminal and transmitting the data to a transaction-processing server for approval.

4. The method of claim 1, further comprising the step of resuming execution of the current task following the data transmission.

5. The method of claim 4, wherein a data stream from the current task is buffered during the combining and transmitting steps.

6. The method of claim 1, wherein the data-processing protocol comprises, by the POS terminal, continuing execution of a current task while concurrently combining the transaction data with item-purchase data received at the POS terminal and transmitting the data to a transaction-processing server for approval.

7. The method of claim 6, wherein concurrent execution of the current task and the combining and transmitting steps occurs by multithreading.

8. The method of claim 7, wherein the multithreading comprises interleaving data and instructions corresponding to the current task with the transaction data and instructions corresponding to the transmission.

9. The method of claim 1, wherein the data-processing protocol comprises:
   caching the transaction data in the reader; and
   upon a trigger signal, releasing the cached transaction data for transmission by the POS terminal to a transaction-processing server for approval.

10. The method of claim 9, wherein the trigger signal is provided by manual selection of a switch on the reader.

11. A terminal for processing transactions at the point of sale, the terminal comprising:
   a communications interface;
   a computer memory;
   an input port for receiving data from a credential reader; and
   a processor configured to (i) recognize a first data sequence in a data stream received from the credential reader via the input port, (ii) retrieve from the computer memory a data-processing protocol in response to the recognized first data sequence, (iii) execute the data-processing protocol and handle, in accordance therewith, transaction data coming in sequence after the first data sequence, (iv) recognize a second data sequence in the received data stream and, in response thereto, terminating data handling according to the data-processing protocol, and (v) complete a transaction based on the transaction data, wherein execution of the data-processing protocol by the processor causes interruption of a concurrently executing task and immediate transmission of the combined data, followed by resumed execution of the interrupted task.

12. The terminal of claim 11, wherein the processor is configured to complete the transaction by combining the transaction data with purchase data including item-purchase data and causing transmission, via the communications interface, of the combined data to a transaction processor.

13. The terminal of claim 12, wherein execution of the data-processing protocol by the processor causes the processor to cache the transaction data in the computer memory and cause the transmission to occur during an interval when the processor is not executing other tasks.

14. The terminal of claim 12, wherein execution of the data-processing protocol by the processor causes the processor to continue execution of a current task while concurrently causing the transaction data to be combined with item-purchase data and transmitted to the transaction processor.

15. The terminal of claim 12, wherein execution of the data-processing protocol by the processor causes the reader to store the transaction data therein and, upon a trigger signal, to release the cached transaction to the terminal for combination with item-purchase data and transmission to the transaction processor.

* * * * *